United States Patent [19]

Tarbell et al.

[11] Patent Number: 4,671,973
[45] Date of Patent: Jun. 9, 1987

[54] METHOD FOR THE TREATMENT OF MINERAL EXTENDER FILLERS

[75] Inventors: Harlan E. Tarbell, Los Angeles; Melvin J. Mirliss, Long Beach, both of Calif.

[73] Assignee: Grefco, Inc., Torrance, Calif.

[21] Appl. No.: 779,054

[22] Filed: Sep. 23, 1985

[51] Int. Cl.$^4$ .............................................. B05D 7/00
[52] U.S. Cl. .................... 427/215; 427/255; 427/255.2
[58] Field of Search .................. 427/221, 255.2, 255.6, 427/255, 255.3, 387, 248.1, 215, 255.4, 219; 428/405

[56] References Cited

U.S. PATENT DOCUMENTS 2,722,504 11/1955 Fleck .................................... 427/221
4,175,159 11/1979 Raleigh ............................... 427/221
4,183,980 1/1980 Nielsen ................................ 427/221
4,486,235 12/1984 Kamigaito et al. ................. 428/405
4,525,388 6/1985 Rehder et al. ....................... 427/221

FOREIGN PATENT DOCUMENTS 627933 9/1961 Canada ................................ 427/221
48-3704 2/1973 Japan ................................ 427/255.6

Primary Examiner—Sadie L. Childs
Attorney, Agent, or Firm—Finnegan, Henderson, Farabow, Garrett & Dunner

[57] ABSTRACT

This invention provides a method for the treatment of mineral extender fillers. The mineral extender filler is treated essentially simultaneously with a halogenated organosilane and a compound containing an active hydrogen, preferably ammonia. The reaction is conducted at atmospheric pressure and at a temperature at which the halogenated organosilane is gaseous, but preferably no higher than 250° C. This method is fast, efficient and economical.

14 Claims, No Drawings

METHOD FOR THE TREATMENT OF MINERAL EXTENDER FILLERS

FIELD OF THE INVENTION

The present invention relates to a method for treating a mineral extender filler in order to render it resistant to moisture and, thereby, make it useful in the field of fillers. The method is continuous and rapid, involving the use of two compounds in their vapor or gaseous state to coat the mineral extender filler to reduce and substantially eliminate any inherent porosity of the original mineral. The reactant compounds used are an organosilane and a co-reactive compound containing an active hydrogen.

BACKGROUND OF THE INVENTION

The treatment of various mineral substances by halogenated organosilanes is known in the art as described in the following U.S. Pat. Nos.: 2,722,504 (Fleck); 2,914,426 (Gaines); 3,963,627 (Cottrell); 4,175,159 (Raleigh); 4,183,980 (Nielsen); 4,214,914 (Ivanchev et al); and 4,255,489 (Nielsen) and Patent Numbers 321502 and 706371 of the Soviet Union.

Various attempts to treat and coat objects, including mineral particles, with halogenated organosilanes have met with various degrees of acceptability, but in the area of treating particulate mineral material, undesirable aspects remain to thwart maximum success. As an undesirable side reaction of the use of halogenated organosilanes is the evolution of gaseous hydrochloric acid in appreciable amounts. Usually this is taken care of by the use of wet scrubbers to absorb the gaseous hydrochloric acid, but a major problem exists in separating the acid gas from the particulate minerals. Attempts to remove the acid gas from the reaction chamber usually causes large amounts of the particulate mineral to be entrained which complicates separation of product and reduces yield. Furthermore, appreciable amounts of unreacted silane is carried to the scrubber system where it belatedly reacts to form a tenacious, usually yellow, deposit throughout the system which requires frequent, costly, time-consuming cleanouts.

Efforts to eliminate the above problems and to improve product quality and yields were concentrated in the areas of different concentrations of the silane, varied reaction temperatures, increased reaction times, introduction into the reaction system of water as liquid or steam or both in an attempt to expedite the hydrolysis reaction with the silane and to increase overall efficiency. None of these efforts has been very successful nor have combinations of these efforts achieved a successful method essentially free of the problems set forth above.

SUMMARY OF THE INVENTION

It is the object of this invention to provide a method for treating and thereby coating the selected particulate mineral extender filler in a chemically efficient manner and economic way. The resultant products are ideally suited as fillers for a wide range of known applications, such as with plastics and construction materials. The present method is conducted by introducing the selected particulated mineral into a reaction chamber and causing the mineral particles to come into contact with a selected gaseous halogenated organosilane and a stoichiometric amount of a gaseous compound containing a reactive hydrogen. The resulting process is efficient and economical and yields a high quality product with the use of relatively inexpensive equipment. The product then possesses valuable properties for use in paint, polymer and latex formulations, among others.

DETAILED DESCRIPTION OF THE INVENTION AND PREFERRED EMBODIMENTS

The mineral material to be treated according to the teaching of this invention may be defined as mineral fillers, mineral extender pigments, mineral extender fillers, mineral functional fillers. These are known minerals that can be prepared by known methods in a wide variety of particle sizes as desired. Some of the contemplated starting materials can be thermally expanded, such as perlite or vermiculite, and then prepared in the desired particle size for treatment according to the teachings of this invention. The original mineral materials contemplated in this invention include talc, clays (kaolins), mica, perlite, vermiculite, diatomaceous earth, calcium carbonate, fumed silica, and the like. Especially advantageous results are obtained with talc, diatomaceous earth, bentonite, perlite, kaolin and calcium carbonate.

The mineral material used in the present invention is milled or otherwise prepared in the desired range of particle size according to known methods and techniques. The selected mineral is introduced into the reaction chamber at or near the top and allowed to flow freely downwardly by gravity. The distribution of flow of the mineral particles is directed essentially chamber wide in order to maximize efficiency and yield.

The silane is introduced into the reaction chamber preferably at a location in the upper part of the chamber in order to promote reaction with the mineral particles promptly after its introduction into the chamber. It is preferred to introduce the gaseous silane across the entire chamber for maximum reaction efficiency. This can be achieved by using a tube with numerous, widely and preferably uniformly distributed, openings or holes so that the introduction of the gaseous silane leads to essentially immediate and intimate contact with all or essentially all of the gravity descending mineral particles.

At substantially the same time, at a location in the reaction chamber near, but preferably below, the tube or other entry device used to introduce the silane into the reaction chamber, there is introduced a gaseous compound having an active hydrogen. This compound is preferably introduced into the reaction chamber gravitationally below the location where the silane is introduced so that the silane has had time to react with the descending mineral particles which leads to the liberation of hydrochloric acid. This introduction can be achieved in a way similar to that of the silane so that intimate introduction will lead to substantially immediate reaction which will help maximize the results of this invention. As before, a tube or entry device with a plurality of holes or openings is desirable for the above described purpose.

After the two above described substantially simultaneous reactions have occurred, the reacted and thereby coated mineral material descends gravitationally quickly and is collected continuously at the bottom of the reaction chamber and removed on a continuous basis as the method of this invention continues uninterruptedly as long as desired.

The organosilane used in this invention may be defined by the formula $$R_{4-A}SiX_A$$

where R is alkyl of one to four carbon atoms, vinyl, or phenyl and X is alkoxy of one to four carbon atoms, acyloxy of one to four carbon atoms, or chlorine, and A is an integer of one to three. The silane is one that is in the vapor state at a temperature no higher than about 250° C. and preferably no higher than about 160° C. Particularly efficient and energy saving are those having a boiling point no higher than about 100° C.

Special embodiments of the silane reactant include trimethylchlorosilane, dimethyldichlorosilane, methyltrichlorosilane, phenyltrichlorosilane, vinyltrichlorosilane and methylvinyldichlorosilane. Especially effective and economical are methyltrichlorosilane and dimethyldichlorosilane. It is possible, if desired, to employ two or more silanes at a time in the present invention, but usually the present process is conducted using a single selected silane.

The other reactant used in conjunction with the organosilane is a compound having a reactive hydrogen atom which may be represented by the formulas $$R_2'NH \text{ or } R''YH$$

in which R' represents hydrogen or alkyl of one to four carbon atoms, R'' represents alkyl of one to four carbon atoms and Y is oxygen or sulfur. The preferred reactants are ammonia, methylamine, diethylamine, methanol, ethanol, butanol, methyl mercaptan and ethylmercaptan. All of these reactants are gaseous within the stated ranges of the silane reactants which is necessary to achieve the maximum useful results of the present invention.

The silane reactant is used in the range of about 0.1 to about 5.0% by weight with respect to the mineral material to be treated, preferably about 0.2 to about 2.0%. The reactive hydrogen compound is used in stoichiometric amounts with respect to the silane reactant. The present reaction is conducted in the temperature ranges in which the reactants are in their gaseous state at substantially atmospheric pressure, preferably not higher than about 100° C. for maximum energy conservation results. The present method may be effectively conducted at temperatures up to about 160° C. or even up to about 250° C., depending on the specific silane employed. Temperatures up to just below the auto ignition temperature of the specific silane employed may be used but the higher temperatures do not offer any particular benefits.

It is necessary to use both the silane and reactive hydrogen compounds in order to achieve the maximum results encompassed by this invention. In contrast, if the reactive hydrogen is omitted, significantly larger amounts, usually two to three times as much of the silane must be used and even then the resultant process is beset with the problems of separation set forth hereinbefore. Also, without the use of the reactive hydrogen compound, comparable amounts of the silane show markedly different disadvantageous results in product performance, such as in water repellancy and coating strength, which are indications of the effectiveness of the present treatment of the mineral extender fillers.

In order to obtain the valuable results of this invention of producing a superior coated mineral extender filler of a wide range of superior properties at lower cost and greater uniformity of result with essential freedom from the problems that plague the known process, one must adhere rigidly to all of the teachings of this invention.

The selected mineral extender filler starting material may be used in a selected range of particle sizes prepared by known methods such as crushing, grinding, milling and the like. Thermally expandable material, such as vermiculite or perlite, can be thermally expanded by known methods and then optionally milled as desired. Typical particle sizes range from standard screen classifications of 50 to beyond 325, with many desirable products being obtained from ranges predominantly 100 mesh to beyond 325, and especially where the particle sizes are predominantly smaller than 200 mesh.

A conventional reaction chamber of reactor is used in carrying out the present process. The reactor can be cylindrical, square or rectangular as commonly available. Mild steel is readily used and satisfactory. In order to minimize corrosion, it is desirable to coat conventionally the interior with a thin layer of rubber or epoxy. The reactor has an appropriate opening in the top for the introduction of the starting material mineral particles with suitable physical distribution so that the particles will mix intimately and thoroughly with the two reactants that are introduced below. Spaced conveniently and conventionally downwardly from the top of the reactor opening is a pair of spaced tubes essentially parallel to each other and horizontal with respect to the reactor which is preferably upright in position. The tubes are conventionally the same material (coated mild steel) as the reactor itself. The tubes snugly penetrate the side of the reactor and are connected independently to sources of the silane reactant, on the one hand, and the reactive hydrogen compound on the other. The tubes have a multitude of holes in them to permit the widest possible introduction and distribution of the reactants and maximal mixing with the gravitationally descending mineral particles. The upper tube is used for the introduction of the silane reactant and has the major portion or possible essentially all its distribution holes or openings on the lower or bottom portion of the tube, although this is not critical. With this arrangement, an atmosphere of silane vapors is created for the passage of the mineral particles to pass intimately and reactively therethrough.

Substantially immediately the downwardly, gravitationally proceeding particles come into the atmosphere of the reactive hydrogen compound created around the conveniently and conventionally located lower tube where the present process is fully consummated. The major portion or substantially all of the distribution holes or openings are preferentially disposed on the upper portion of the lower tube. The reacted and, thereby, coated mineral extender filler is continuously collected and removed from the bottom of the reactor chamber by known methods. All of this will be clearly understood from the above description by those skilled in the art in view of the teachings and objectives of this invention.

The following specific examples are presented to illustrate various specific embodiments of the present invention and are by way of illustration and not to be construed as limitations of the present invention. All amounts are expressed as parts by weight.

EXAMPLE I

There was introduced into the top of a reaction chamber finely particled and broadly dispersed diatomaceous earth, at the rate of 120 grams per minute. There was introduced and reacted with the diatomaceous earth 0.2% by weight, with respect to the diatomaceous earth, of dimethyldichlorosilane and a stoichiometric amount, with respect to the dimethyldichlorsilane of ammonia. The reaction temperature was maintained at 120° C. The reacted and covered diatomaceous earth was collected and tested.

The same reaction was repeated except in the absence of ammonia. The product was collected and tested.

The product that was obtained by the teachings of this invention gave results, especially in hydrophobicity, significantly superior to the product obtained by the treatment with the silane alone.

EXAMPLE II

There were reacted at a temperature of 120° C. at the rate of 120 grams per minute milled, expanded perlite having a particle size ranging from 50 mesh through 325 mesh with the majority finer than 325 mesh, and 0.5% by weight, with respect to the perlite, of dimethyldichlorosilane, and a stoichiometric amount, with respect to the dimethyldichlorosilane of ammonia. The reacted and covered perlite was collected and tested.

The same reaction was repeated except in the absence of ammonia. The product was collected and tested.

The product that was obtained by the teachings of this invention gave results, especially in hydrophobicity and coating strength, significantly superior to the product obtained by the treatment with the silane alone.

Similar results were obtained when talc and kaolin were substituted for the perlite.

EXAMPLE III

The processes of EXAMPLE II were repeated reacting expanded perlite with 0.24%, 0.5%, 0.54%, 0.72%, 0.79%, 1.00%, 1.50%, 1.60%, 1.90%, 2.00%, 2.10% and 2.2% of the dimethyldichlorosilane with results parallel to those obtained in EXAMPLE II.

EXAMPLE IV

The processes of EXAMPLE II were repeated using 1.7% and 1.9% of vinyltrichlorosilane and 1.7%, 1.8%, 1.9% and 2.0% of trimethylchlorosilane as the silane reactants with results comparable to those obtained in EXAMPLE II.

The processes of EXAMPLE II were repeated using diethylamine and methylamine as the reactive hydrogen reactant with results similar to those obtained in EXAMPLE II.

EXAMPLE V

The processes of EXAMPLE II were repeated using equal part mixtures of trimethylchlorosilane and dimethyldichlorosilane, as well as methyltrichlorosilane and dimethyldichlorosilane in amounts of 1.8% to 2.8% as the silane reactant with results parallel to those of EXAMPLE II.

EXAMPLE VI

The processes of EXAMPLE II were repeated using reaction temperature of 160° C. and 250° C. with 0.5%, 2.0% and 5.0% of the dimethyldichlorosilane with results similar to those of EXAMPLE II.

It will be apparent to those skilled in the art that modifications and variations can be made in the method of the present invention without departing from the scope or spirit of the invention. It is intended that the present invention cover the modifications and variations of this invention that come within the scope of the appended claims and their equivalents.

We claim:

1. A method for the treatment of a mineral extender filler which comprises reacting said filler with about 0.1% to about 5.0% by weight, with respect to said filler, of a silane having the formula $R_{4-A} SiX_A$ and a stoichiometric amount, with respect to said silane, of a reactive hydrogen compound selected from the class consisting of $R_2'NH$ and $R''YH$, at a temperature of up to about 250° C. at which said silane and said compound are both in the vapor state, in which R is selected from the class consisting of alkyl of one to four carbon atoms, vinyl and phenyl;

X is selected from the class consisting of alkoxy of one to four carbon atoms, acyloxy of one to four atoms, and chlorine;

A is an integer of one to three;

R' is selected from the class consisting of hydrogen and alkyl of one to four carbon atoms;

R'' is selected from the class consisting of alkyl of one to four carbon atoms; and Y is selected from the class consisting of oxygen and sulfur.

2. A method according to claim 1 in which there is used a temperature of up to about 160° C.

3. A method according to claim 1 in which there is used a temperature of up to about 100° C.

4. A method according to claim 1 in which there is used a temperature of up to about 160° C. and about 0.2% to about 2.0% of said silane.

5. A method according to claim 1 in which there is used a temperature of up to about 100° C. and about 0.2% to about 2.0% of said silane.

6. A method according to claim 2 in which said silane is dimethyldichlorosilane and said compound is ammonia.

7. A method according to claim 2 in which said silane is methyltrichlorosilane and said compound is ammonia.

8. A method according to claim 3 in which said silane is dimethyldichlorosilane and said compound is ammonia.

9. A method according to claim 3 in which said silane is methyltrichlorosilane and said compound is ammonia.

10. A method according to claim 6 in which said filler is perlite.

11. A method according to claim 6 in which said filler is diatomaceous earth.

12. A method according to claim 7 in which said filler is perlite.

13. A method according to claim 7 in which said filler is diatomaceous earth.

14. A method according to claim 7 in which said filler is kaolin.

* * * * *